US006493687B1

(12) United States Patent
Wu et al.

(10) Patent No.: US 6,493,687 B1
(45) Date of Patent: Dec. 10, 2002

(54) APPARATUS AND METHOD FOR DETECTING GLASS BREAK

(75) Inventors: Ji Wu; William S. DiPoala, both of Fairport, NY (US)

(73) Assignee: Detection Systems, Inc., Fairport, NY (US)

( * ) Notice: Subject to any disclaimer, the term of this patent is extended or adjusted under 35 U.S.C. 154(b) by 0 days.

(21) Appl. No.: 09/465,254

(22) Filed: Dec. 18, 1999

(51) Int. Cl.[7] ................................................ G06F 9/445

(52) U.S. Cl. ........................... 706/15; 706/40; 340/550; 340/541; 340/544

(58) Field of Search ..................... 706/15, 40; 340/550, 340/541, 544, 426; 348/88; 367/124; 358/296

(56) References Cited

U.S. PATENT DOCUMENTS 4,906,940 A * 3/1990 Greene et al. .............. 382/100
5,192,931 A * 3/1993 Smith et al. ................ 340/550
5,414,409 A * 5/1995 Voosen et al. .............. 340/541
5,444,535 A * 8/1995 Axelrod ...................... 356/369
5,450,061 A * 9/1995 McMaster ................... 340/550
5,491,650 A * 2/1996 Barhen et al. ................. 708/7
5,504,717 A * 4/1996 Sharkey et al. ............. 367/124
5,515,029 A * 5/1996 Zhevelev et al. ........... 340/544
5,521,840 A * 5/1996 Bednar ....................... 702/183
5,552,770 A * 9/1996 McMaster ................... 340/550
5,598,141 A * 1/1997 Grasmann et al. .......... 340/426
5,680,096 A * 10/1997 Grasmann et al. .......... 340/426
5,680,515 A * 10/1997 Barhen et al. ................ 706/34
5,703,835 A * 12/1997 Sharkey et al. ............. 367/124
5,729,193 A * 3/1998 Grasmann et al. .......... 340/426
5,751,209 A * 5/1998 Werner et al. ......... 349/286.05
5,815,198 A * 9/1998 Vachtsevanos et al. ....... 348/88
5,822,077 A * 10/1998 Sasaki et al. ............... 358/296
6,053,047 A * 4/2000 Dister et al. .................. 73/593

OTHER PUBLICATIONS

Defect Prediction With Neural Network, Robert L. Stites, Bryan Ward, Robert W. Walters, IKONIX Inc., & STR CORP., (1991), ACM 089791–432–5/91/0005/0199.*

A Neural Network for Target Classwification Using Passive Sonar, Robert H. Baran, James P. Coughlin, (1991), ACM, 098791–432–5/91/0005/0188.*

* cited by examiner

*Primary Examiner*—Thomas Black
*Assistant Examiner*—Michael B. Holmes
(74) *Attorney, Agent, or Firm*—Brian B. Shaw, Esq.; Stephen B. Salai; Harter, Secrest & Emery LLP

(57) ABSTRACT

A glass break detector is disclosed that uses a neural network to determine if an audio signal is breaking glass. A characteristic extraction unit is used to extract a set of signal characteristics from a time domain signal based on the audio signal. The set of signal characteristics is the set of the magnitudes of the discrete Fourier transform coefficients of an acquired time domain signal, or the Fourier transform coefficients themselves. A classifier is connected to the characteristic extraction unit. It is a two-layer neural network that uses the set of signal characteristics to accurately determine whether the acquired time domain signal represents breaking glass.

43 Claims, 4 Drawing Sheets

APPARATUS AND METHOD FOR DETECTING GLASS BREAK

FIELD OF THE INVENTION

The present invention relates generally to glass break detectors, and more particularly to glass break detectors that use neural networks to determine if an atmospheric wave was created by glass breaking.

BACKGROUND OF THE INVENTION

In an era of high crime, property owners are concerned about the security of both their property, and persons on the premises. Thus, security systems for both the home and business have experienced an increase in demand. Glass break detectors are a necessity for any security system that is used to safeguard structures having glass windows and doors.

One approach that has considered involves the use of a window mounted piezoelectric glass detector. This device detects vibrations that occur when glass breaks. These devices have been fairly reliable in detecting glass breaks and do not respond to false conditions such as knocking on the glass. However, piezoelectric glass break detectors have a significant drawback. Multipane windows, or rooms with multiple windows, require separate detectors and wiring for each pane of glass. Thus, these devices can be both costly and unsightly under these circumstances.

In another approach that has been considered, analog audio discriminators have been developed to solve the problems associated with the window mounted units. These units include a microphone for converting the sound to an electrical signal. An analog processor detects glass breakage by measuring the slope of the electrical signal. However, these analog devices also have a significant drawback. They are prone to false alarms because they are unable to discriminate between glass break sounds and similar sounds.

In yet another approach that has been considered, a digital audio discriminator has been developed to reduce the number of false alarms and increase the accuracy of the detector. A Harris 800 supercomputer was used to analyze Power Spectral Density (PSD) of glass break signals and in doing so, identify the dominant features of breaking glass. A neural network was developed and trained to recognize the dominant features identified by the super computer. The resultant digital glass break detector was very sophisticated. It included a microphone that converted sound energy into an electrical signal, analog to digital conversion, and a digital signal processor (DSP) to process the resultant digital signal. The DSP calculated the PSD of the digital signal and extracted the dominant features of the PSD. The dominant features were used by a neural network embedded in the DSP to evaluate the digital signal. There is a significant drawback to this approach as well. The processing power of a DSP is needed to extract the dominant features from the signal and use them to perform neural network processing. Unfortunately, DSPs are expensive and the resultant device may not be affordable for many home owners.

Thus, a need exists for a glass break detector that incorporates the sophistication and accuracy of a neural network without the costs associated with complex digital signal processing.

SUMMARY OF THE INVENTION

Existing problems with current state of the art glass break detectors are addressed by the present invention. An inexpensive processor calculates a set of signal characteristics such as the discrete fourier transform coefficients of an acquired time domain signal using a Discrete Fourier Transform or a Fast Fourier Transform. The magnitudes of each coefficient may also be used. A two-layer neural network uses the set of signal characteristics to accurately detect breaking glass. This design eliminates the unnecessary and overly complex processing used in calculating the PSD and evaluating the dominant features of the PSD. Thus, the efficient design of the present invention has no need for an expensive DSP. The present invention is implemented using a floating point processor that costs a few dollars. The present invention features an extremely accurate and low-cost glass break detector.

One aspect of the present invention is an apparatus for detecting breaking glass in an environment. The apparatus comprises: a sensor unit for acquiring a time domain signal from the environment; a characteristic extraction unit connected to the sensor for extracting a set of signal characteristics from the time domain signal; and a classifier connected to the characteristic extraction unit, wherein the set of signal characteristics are used by the classifier as an input data set to determine whether the time domain signal represents breaking glass.

In another aspect, the present invention includes a method for detecting breaking glass in an environment. The method comprising the steps of: acquiring a time domain signal from the environment; extracting a set of signal characteristics from the time domain signal; and, classifying the time domain signal by using the set of signal characteristics as a set of input data. to determine whether the time domain signal represents breaking glass.

In yet another aspect, the present invention includes a method for fabricating an apparatus for detecting breaking glass in an environment. The method comprising the steps of: providing a sensor unit for acquiring a time domain signal from the environment; providing a characteristic extraction unit connected to the sensor for extracting a set of signal characteristics from the time domain signal; providing a classifier connected to the feature extraction element; and training the classifier by inputting a plurality of collected signal samples to the classifier and setting an output of the classifier to a desired value, wherein the classifier is trained to determine whether the time domain signal represents breaking glass by learning to associate the plurality of collected signal samples with a corresponding desired output.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
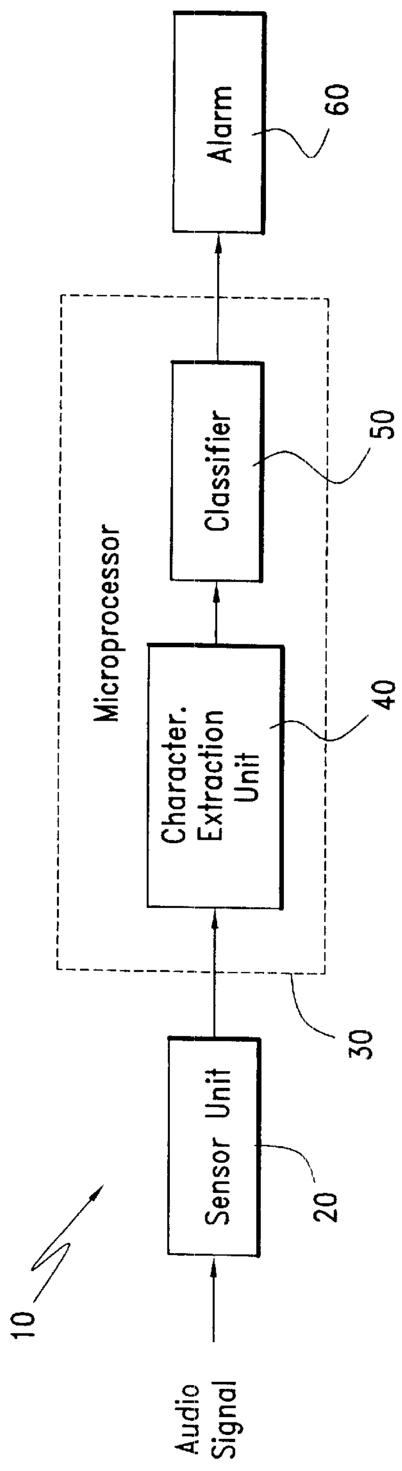
FIG. 1 is a functional block diagram of the present invention.

Reference will now be made in detail to the present preferred embodiment of the invention, an example of which is illustrated in the accompanying drawings. Wherever possible, the same reference numbers will be used throughout the drawings to refer to the same or like parts. An exemplary embodiment of the glass break detector of the present invention is shown in FIG. 1, and is designated generally throughout by reference numeral 10.

In accordance with the invention, the present invention for a glass break detector includes a characteristic extraction unit and a signal classifier. The characteristic extraction unit is used to extract a set of signal characteristics from a time domain signal acquired from the environment. The set of signal characteristics are the discrete fourier transform coefficients of an acquired time domain signal or their magnitudes. The classifier is a two-layer neural network that is connected to the characteristic extraction unit. It uses the set of signal characteristics to accurately determine whether the acquired time domain signal represents breaking glass. The characteristic extraction unit and classifier are software modules embedded in an inexpensive eight-bit or sixteen bit floating point microprocessor.

As embodied herein, and depicted in FIG. 1, glass break detector 10 includes sensor unit 20, characteristic extraction unit 40, and classifier 50. In an exemplary embodiment, characteristic extraction unit 40 and classifier 50 are software modules embedded in microprocessor 30. The output of classifier 50 is connected to the input of alarm 60. Sensor unit 20 converts an atmospheric wave into an analog electrical time domain signal. Characteristic extraction unit 40 digitizes the signal and extracts its frequency characteristics. Classifier 50 uses the characteristics to detect glass breaking. As depicted in FIG. 1, characteristic extraction unit 40 and classifier 50 are implemented in processor 30. A more detailed discussion of the structural aspects of the present invention is presented below.

Figure 2:
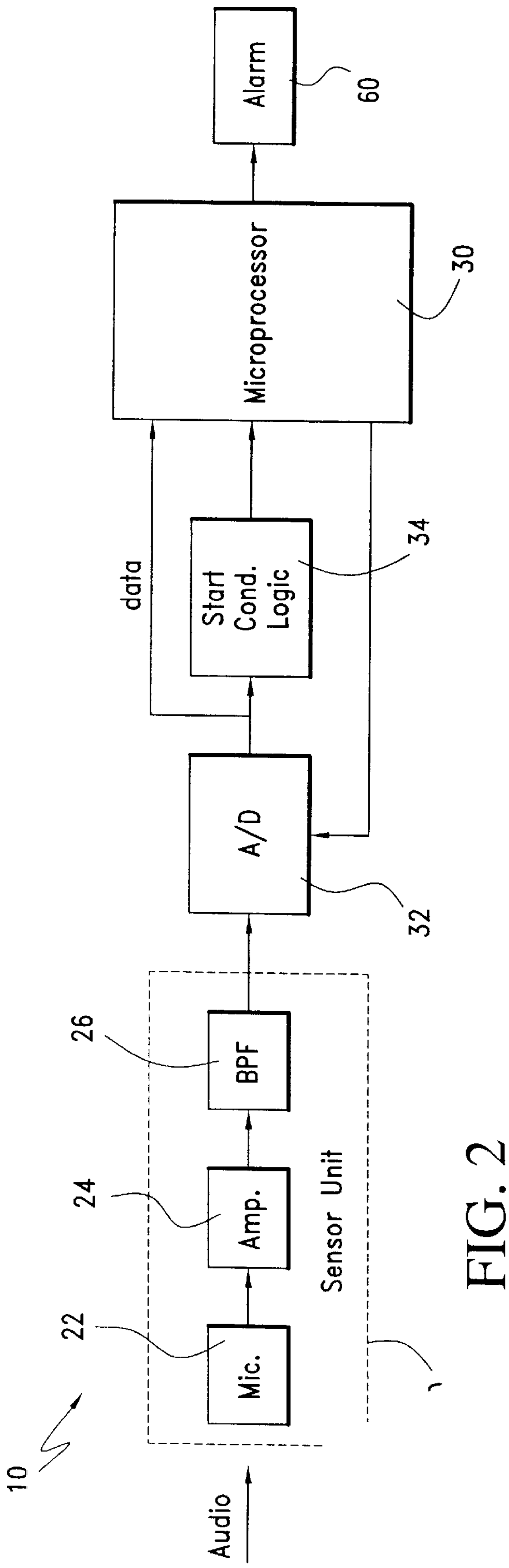
FIG. 2 is a structural diagram of the present invention.

As embodied herein and depicted in FIG. 2, a structural diagram of detector 10 of the present invention is disclosed. Sensor 20 is connected to A/D converter 32. A/D converter 32 is connected to start condition logic 34. The output of start condition logic 34 is connected to microprocessor 30. Microprocessor 30 is connected to alarm 60.

Figure 3:
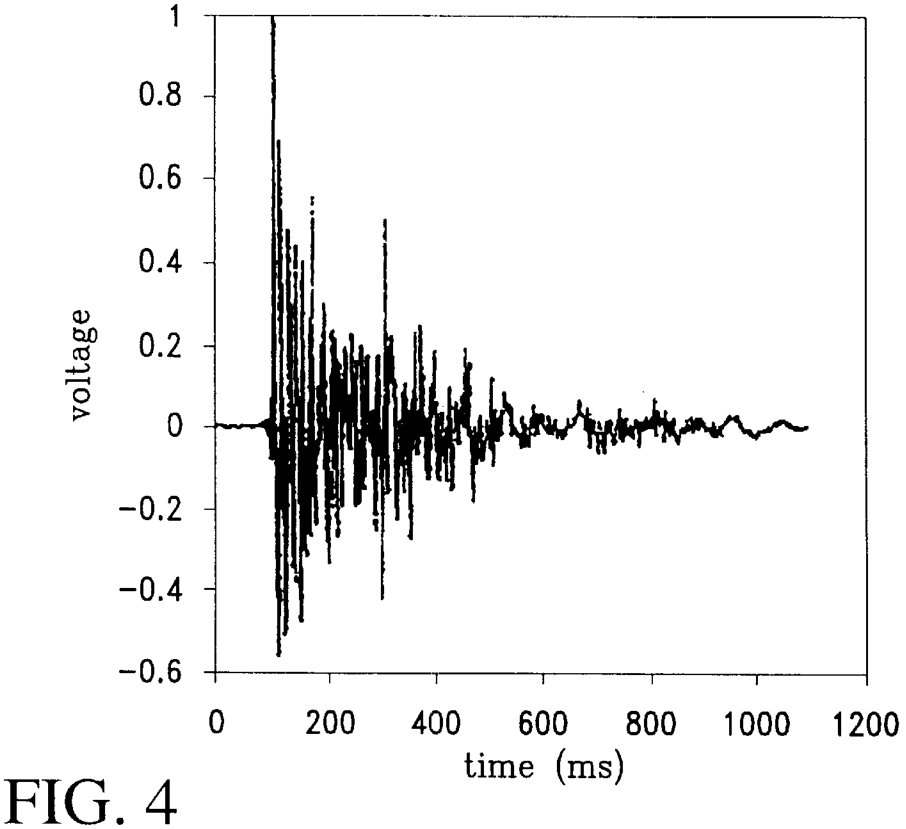
FIG. 3 is a plot of voltage as a function of time for a glass break signal.
Figure 4:
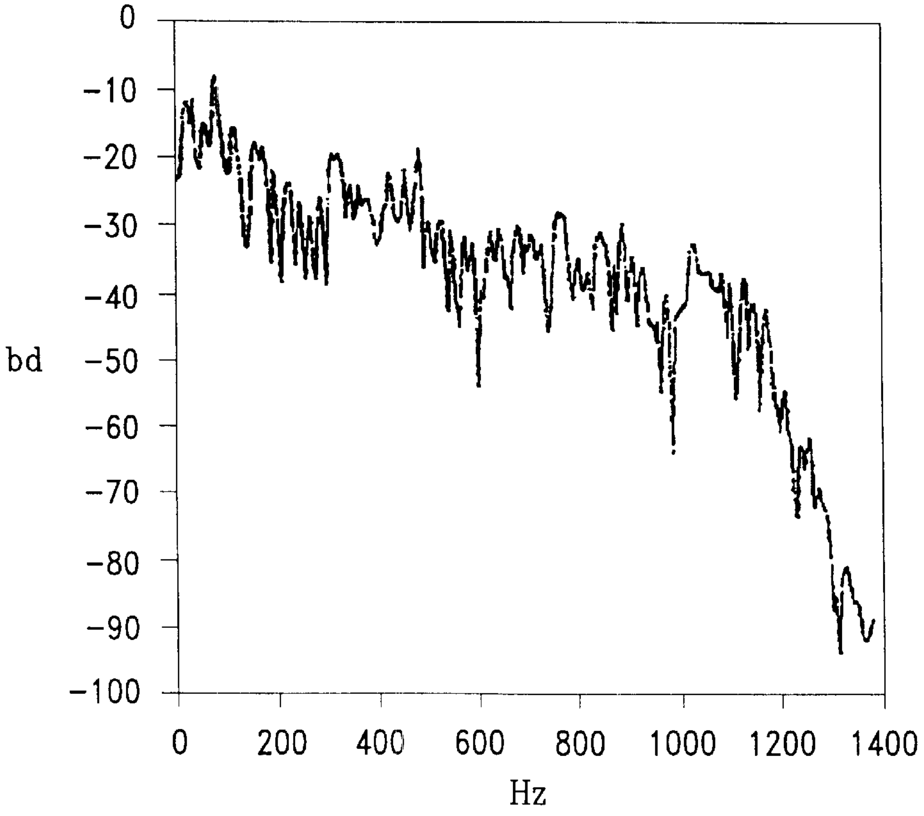
FIG. 4 is a signal diagram of the frequency spectrum of the time domain signal depicted in FIG. 3.

Sensor 20 may be of any suitable well known type, but there is shown by way of example, a microphone 22 connected to amplifier 24, which is connected to bandpass filter 26. FIG. 3 is a signal diagram representing a time domain glass break signal. In particular, it shows the voltage output of microphone 22 as a function of time. Amplifier 24 boosts the output signal voltage of microphone 22 to a level that is compatible with bandpass filter 26. FIG. 4 is a plot of the frequency spectrum of the time domain signal depicted in FIG. 3. Bandpass filter 26 has a pass-band between 20 hz and 1200 hz. Thus, the highest frequency component of the filtered time domain signal is 1200 hz. Filter 26 also serves as an anti-aliasing filter.

A/D converter 32 may be of any suitable well know type, but there is shown by way of example a discrete component well known to those of ordinary skill in the art. However, A/D converter 32 may be incorporated as part of microprocessor 30, in which case the discrete component is not needed. As discussed above, the highest frequency of the time domain signal is 1200 hz. Thus, the sampling rate must be at least the Nyquist rate of 2400 hz. However, in a preferred embodiment the sampling rate is set to rate approximately equal to 3125 hz for anti-aliasing reasons.

Start condition logic unit 34 may be of any suitable well-known type, but there is disclosed a voltage measurement device, a subtractor, and at least one threshold comparator. The amplitude of each voltage sample is measured. A first voltage sample is subtracted from a second voltage sample to determine the slope of the time domain signal. The slope threshold is set at 0.3 V and represents a slope of about 937.5 v/sec. The second threshold is set at 0.5 V. When these conditions are met, start condition unit 34 transmits a start condition signal to processor 30. When processor 30 receives a start condition signal from the start condition logic unit 34, it collects 128 samples of the time domain voltage signal. This translates to approximately 40 msec of sampling time.

Microprocessor 30 may be of any suitable well-known type, but there is shown by way of example a general purpose sixteen-bit floating point processor. One of ordinary skill in the art will recognize that an eight-bit floating point processor, a pentium device, or a DSP could be used depending on cost-performance considerations.

Figure 5:
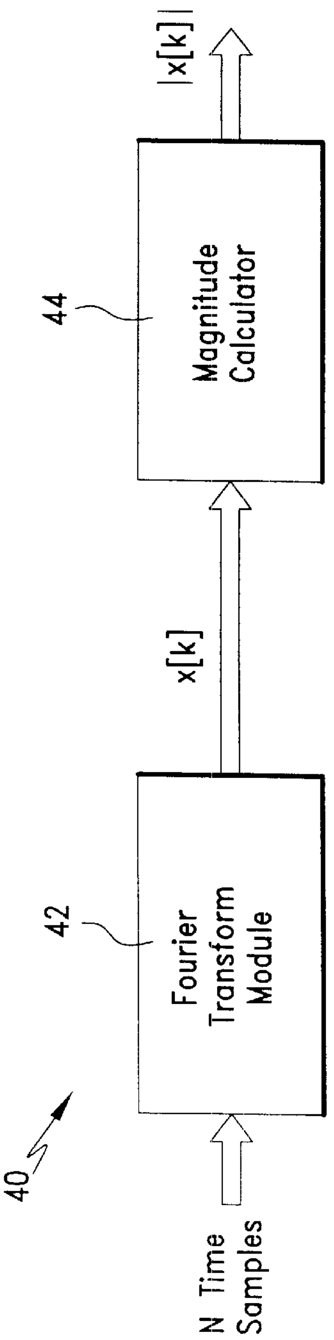
FIG. 5 is a block diagram of the characteristic extraction unit of the present invention.

As embodied herein and depicted in FIG. 5, a block diagram of characteristic extraction unit 40 of the present invention is disclosed. In a preferred embodiment, characteristic extraction unit 40 includes fourier transform module 42 which is connected to magnitude calculator 44. As discussed above, characteristic extraction unit 40 is a software module embedded in processor 30.

Fourier transform unit 42 may be of any well known type, but there is shown by way of example a Fast Fourier transform module that transforms the 128 time domain samples into frequency samples, x[k] for k=0 to 127. One of ordinary skill in the art will recognize that a Discrete Fourier transform can also be used to perform the fourier transform.

Magnitude calculator 44 calculates the absolute value |x[k]|, for each x[k]. Note that x[k] is a complex number. Hence, the magnitude is given by:

$$|x[k]| = \sqrt{\{\mathrm{Re}(x[k])\}^2} \textit{ for } k=0 \text{ to } 127,$$

Since the spectrum of the magnitudes |x[k]| is symmetric, only the first 64 samples are needed. Thus, in a preferred embodiment of the present invention, |x[k]| is calculated only for k=0 to 63.

Figure 6:
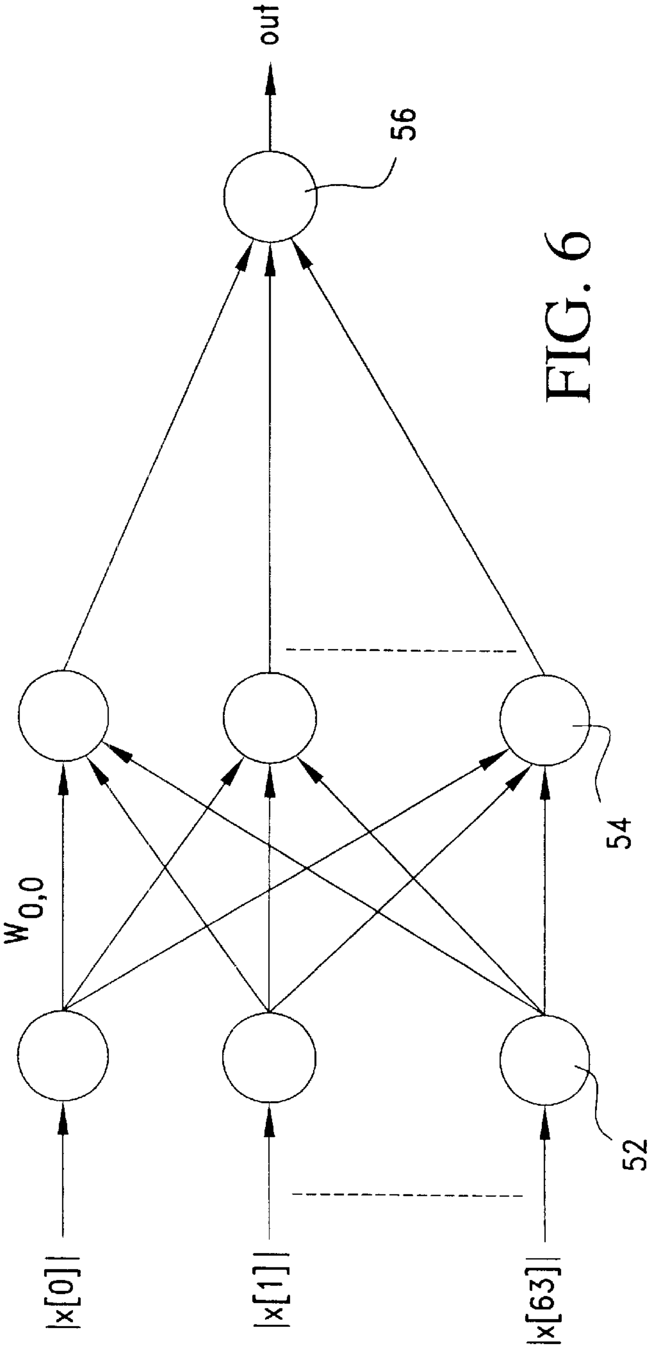
FIG. 6 is a diagram of the classifier neural network of the present invention.

As embodied herein and depicted in FIG. 6, a diagram of classifier 50 of the present invention is disclosed. Classifier 50 may be of any suitable well known type, but there is shown by way of example a feed forward neural network. Input neurons 52 are connected to hidden layer 54. The outputs of hidden layer 54 are connected to output neuron 56. In a preferred embodiment, there are 64 input neurons corresponding to signal characteristics |x[k]| for k=0 to 63.

One of ordinary skill in the art will recognize that 128 input neurons are required if frequency samples x[k] are used as the signal characteristics. Each input neuron 52 is connected to each neuron in hidden layer 54 by a weighted connection. Each neuron in hidden layer 54 is likewise connected to output neuron 56 by a weighted connection.

Figure 7:
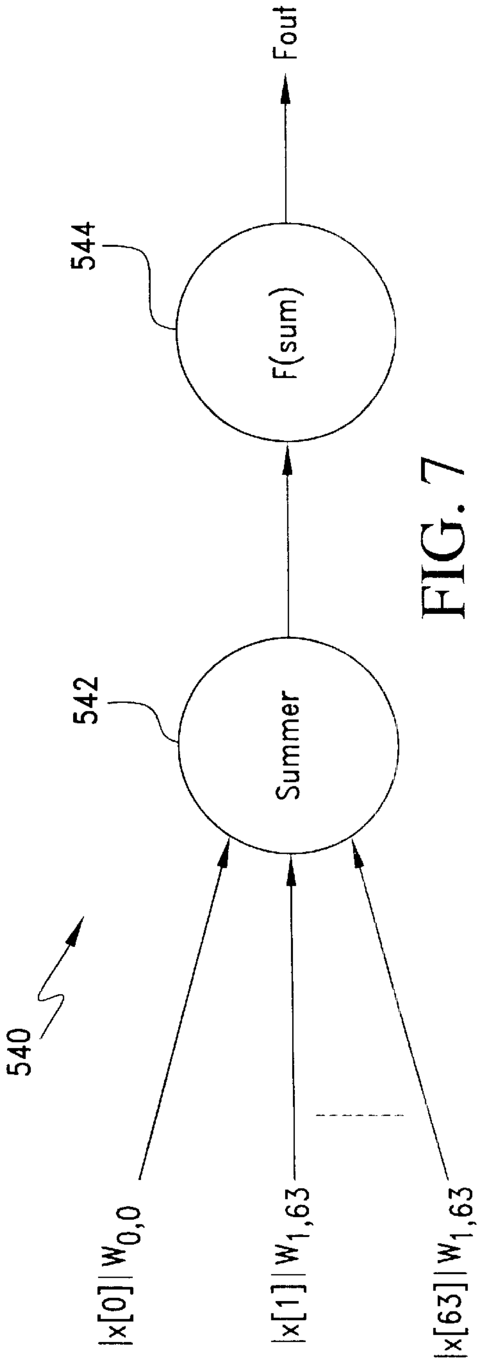
FIG. 7 is a diagram of a hidden layer neuron used in the neural network of the present invention.

FIG. 7 is a diagram of a hidden layer neuron 540 shown in FIG. 6. Weighted values $W_{0,0}\cdot|x[0]|$ to $W_{0,63}\cdot|x[63]|$ appear at the input of neuron 540 and summed by summer 542. The output of summer 542 is connected to function calculator 544. The transfer function of calculator 544 is given by:

$$F(y) = \frac{1}{1 + e^{-y}},$$

F(y) is commonly known as the sigmoid function. It limits the output of function calculator 544 to a range [0,1]. The number of neurons in the hidden layer 540 is in an approximate range between 100 and 140 neurons. If the number of neurons in the hidden layer falls much below 100, the accuracy of neural network deteriorates from lack of recall. If the number of neurons in the hidden layer exceeds 140, the accuracy of neural network will likewise deteriorate. In the later case, the excess neurons introduce a condition known by those of ordinary skill as over-oscillation, which can be considered as a form of noise.

Figure 8:
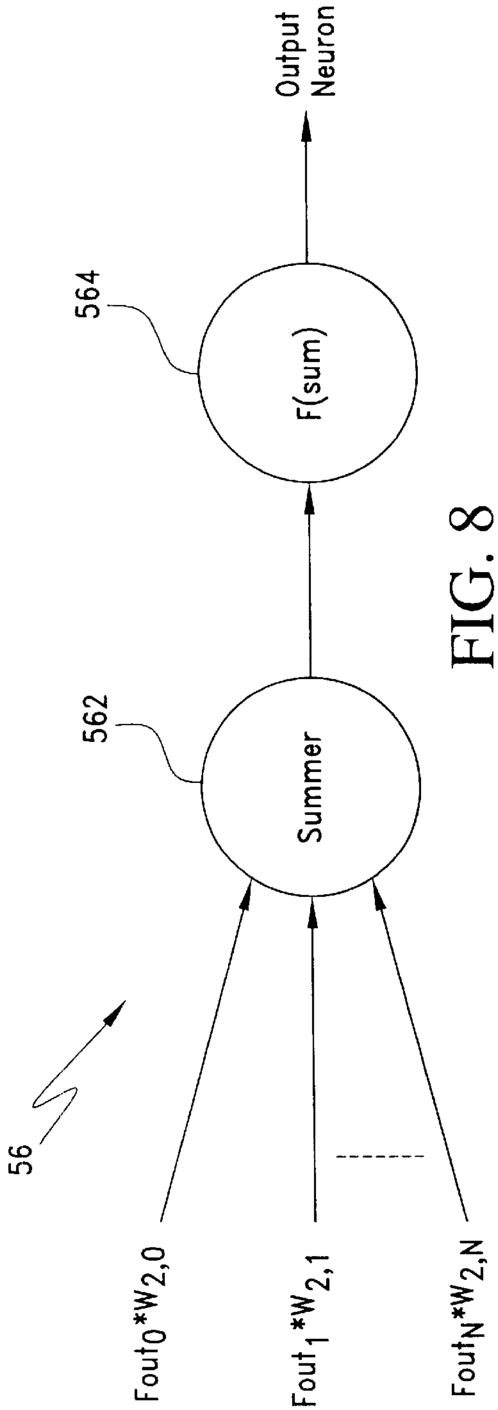
FIG. 8 is a diagram of the output neuron of the neural network of the present invention.

FIG. 8 is a diagram of output neuron 56 of classifier 50 of the present invention. Its structure is identical to that of hidden neuron 540, which was discussed above. The output of each neuron in hidden layer 54 is present at the input of output neuron 56. Again, hidden layer 54 outputs are multiplied by weights to form weighted values $W_0\cdot F(0)$ to $W_N\cdot F(N)$, where 100<N<140, as discussed above. The weighted values are summed by summer 562. The output of summer 562 is connected to function calculator 564. The transfer function of calculator 564 is given by the sigmoid function, which was discussed above. Thus, the output of classifier 50 is limited to the range [1,0]. Since the number being output from calculator is likely to be between 0 and 1, a threshold of 0.9 is used. If the output is greater than or equal to 0.9, the classifier determines that the atmospheric wave that created the time domain signal was created by glass breaking.

As embodied herein and depicted in FIG. 9, a flow chart showing the method used to train classifier 50 during the fabrication of detector 10. One of ordinary skill in the art will recognize that implementing the hardware design depicted in FIG. 2 is a prerequisite to training classifier 50. The decision to use a low cost processor in the implementation of detector 10 impacts the design of classifier 50. In step 100, the topology depicted in FIG. 6 is formed. In step 102, the weights assigned to the connections between the input layer 52 and hidden layer 54, and the weights assigned to the connections between between hidden layer 54 and output layer 56 are assigned by randomization.

In step 104, data from a database containing thousands of glass break and non-glass break sounds is accessed. In the present invention, a database was constructed wherein over 1,000 pieces of glass were broken. Sixteen samples were recorded for each type of glass to account for different acoustic environments. This adds up to more than 16,000 glass break samples. Thousands of non-glass break sounds were also recorded.

In subsequent steps, a set of signal characteristics for each sound sample is extracted and supplied to input layer 52. Output neuron 56 of classifier 50 is set to a desired output. In other words, if the sample is taken from a glass break sound, the output will be set to one. Non-glass break sounds will be set to zero. In step 112, the backpropagation algorithm is used to adjust the weighted connections between input layer 52, hidden layer 54 and the output neuron 56. This step is repeated for each sample in the database. The adjusted weights provide the neural network the ability to recall all of the sounds used in the training.

While the invention has been described with reference to preferred embodiments, it will be understood by those skilled in the art that various changes may be made and equivalents may be substituted for elements thereof without departing from the scope of the invention. In addition, many modifications may be made to adapt a particular situation of material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. An apparatus for detecting breaking glass in an environment, said apparatus comprising:

a sensor unit for acquiring a time domain signal from the environment;

a characteristic extraction unit connected to said sensor for extracting a set of signal characteristics from said time domain signal; and a classifier connected to said characteristic extraction unit, wherein said set of signal characteristics are used by said classifier as an input data set to determine whether said time domain signal represents breaking glass.

2. The apparatus according to claim 1, wherein the set of signal characteristics are extracted by sampling the time domain signal N times at a rate greater than or equal to a Nyquist rate to thereby create a set of N time domain samples.

3. The apparatus according to claim 2, wherein the set of signal characteristics are extracted by performing a Fourier Transform on the set of N time domain samples to thereby create a set of N frequency domain coefficients.

4. The apparatus according to claim 3, wherein the set of signal characteristics comprises a set of N magnitude values calculated by taking the absolute value of each of the N frequency domain coefficients.

5. The apparatus according to claim 3, wherein the Fourier Transform is a Fast Fourier Transform (FFT).

6. The apparatus according to claim 3, wherein the Fourier Transform is a Discrete Fourier Transform (DFT).

7. The apparatus according to claim 1, wherein the set of signal characteristics comprises a set of magnitudes of N frequency coefficients and the input data set is formed by selecting N/2 magnitudes of said N frequency magnitudes.

8. The apparatus according to claim 7, wherein N=128.

9. The apparatus according to claim 1, wherein the sensor unit further comprises:

a transducer for converting atmospheric waves into the time domain signal, wherein the time domain signal is an analog electrical signal;

an amplifier connected to said transducer for amplifying the time domain signal; and, a bandpass filter connected to said amplifier for band-limiting the time domain signal to a predetermined pass-band of frequencies.

10. The apparatus according to claim 9, wherein the predetermined pass-band of frequencies is an approximate range between 20 hz and 1200 hz.

11. The apparatus according to claim 1, further comprising a start condition detection element connected to the sensor unit for detecting a start condition from the time domain signal.

12. The apparatus according to claim 11, wherein the start condition detection unit transmits a start signal to the characteristic extraction unit in response to detecting the start condition.

13. The apparatus according to claim 12, wherein the characteristic extraction unit extracts the set of signal characteristics in response to the start signal.

14. The apparatus according to claim 11, wherein the start condition is a predetermined slope and a predetermined magnitude of the time domain signal.

15. The apparatus according to claim 14, wherein the predetermined slope is approximately 938 volts/second and the predetermined magnitude is approximately 0.5 volts.

16. The apparatus according to claim 1, wherein the classifier comprises a neural network.

17. The apparatus according to claim 16, wherein the neural network comprises a feedforward neural network.

18. The apparatus according to claim 17, wherein the neural network includes an input layer of input neurons, a hidden layer of hidden neurons, and an output neuron, wherein each of said input neurons is connected to each of said hidden neurons by a first set of weighted connections, and each of said hidden neurons is connected to said output neuron by a second set of weighted connections.

19. The apparatus according to claim 18, wherein the set of signal characteristics includes N elements and the input data set includes N/2 elements.

20. The apparatus according to claim 19, wherein the input layer comprises N/2 input neurons for inputting the input data set into the neural network.

21. The apparatus according to claim 18, wherein the hidden layer comprises a number of hidden neurons in an approximate range of between 100 and 140 neurons.

22. The apparatus according to claim 21, wherein an output of each hidden neuron is characterized by a sigmoid function.

23. The apparatus according to claim 18, wherein the output neuron is characterized by a sigmoid function.

24. The apparatus according to claim 18, wherein the neural network is trained to recognize a plurality of collected signal samples as either a glass break signal or a non-glass break signal by a backpropagation algorithm.

25. The apparatus according to claim 24, wherein the backpropagation algorithm trains the neural network to determine whether the time domain signal represents breaking glass by causing the neural network to associate each of the plurality of collected signal samples to a desired neural network output by adjusting the first set of weighted connections and the second set of weighted connections.

26. The apparatus according to claim 25, wherein the plurality of collected signal samples comprises a plurality of glass break sound samples and a plurality of non-glass break sound samples.

27. The apparatus according to claim 1, further comprising a microprocessor, wherein the characteristic extraction unit and the classifier comprise software modules that are executed by said microprocessor.

28. The apparatus according to claim 27, wherein the microprocessor comprises an eight bit floating point processor.

29. The apparatus according to claim 27, wherein the microprocessor comprises a sixteen bit floating point processor.

30. The apparatus according to claim 27, wherein the microprocessor comprises a digital signal processor.

31. A method for detecting breaking glass in an environment, said method comprising the steps of:

acquiring a time domain signal from the environment;

extracting a set of signal characteristics from said time domain signal; and, classifying said time domain signal by using said set of signal characteristics as a set of input data to determine whether said time domain signal represents breaking glass.

32. The method according to claim 31, wherein the step of acquiring further comprises the steps of:

converting atmospheric waves into the time domain signal, wherein the time domain signal is an analog electrical signal;

amplifying the time domain signal; and, filtering the time domain signal to eliminate frequency components of the time domain signal outside a predetermined pass-band of frequencies.

33. The method according to claim 31, wherein the step of extracting includes sampling the time domain signal N times at a rate greater than or equal to a Nyquist rate to thereby create a set of N time domain samples.

34. The method according to claim 33, wherein the set of signal characteristics are extracted by performing either a Discrete Fourier Transform (DFT) or a Fast Fourier Transform (FFT) on the set of N time domain samples to thereby create a set of N frequency domain coefficients.

35. The method according to claim 34, wherein the set of signal characteristics comprises a set of N magnitude values calculated by taking the absolute value of each of the N frequency domain coefficients.

36. The method according to claim 35, wherein the input data set is formed by selecting N/2 magnitude values of the set of N magnitude values.

37. The method according to claim 31, wherein the step of classifying includes the step of providing a neural network comprising an input layer of input neurons, a hidden layer of hidden neurons, and an output neuron, wherein each of said input neurons is connected to each of said hidden neurons, and said output neuron is connected to each of said hidden neurons in said hidden layer.

38. The method according to claim 37, wherein the step of classifying further comprises the steps of:

multiplying each element of the input data set by an input weight to thereby form a first set of weighted inputs;

summing said first set of weighted inputs to form an input sum for each hidden neuron;

calculating a hidden neuron output using a sigmoid function, wherein said sigmoid function is a function of said input sum;

multiplying each of said hidden neuron outputs by an output weight to thereby form a second set of weighted inputs;

summing said second set of weighted inputs to form a second input sum at an input of the output neuron; and calculating a classifier output using said sigmoid function, wherein said sigmoid function is a function of said second input sum.

39. A method for fabricating an apparatus for detecting breaking glass in an environment, said method comprising the steps of:

providing a sensor unit for acquiring a time domain signal from the environment;

providing a characteristic extraction unit connected to said sensor for extracting a set of signal characteristics from said time domain signal;

providing a classifier connected to said feature extraction element; and training said classifier by inputting a plurality of collected signal samples to said classifier and setting an output of said classifier to a desired value, wherein said classifier is trained to determine whether said time domain signal represents breaking glass by learning to associate said plurality of collected signal samples with said desired value.

40. The method according to claim 39, wherein the step of providing a classifier comprises the step of providing a forward feeding neural network having an input layer, a hidden layer connected to said input layer by a first set of weighted connections, and an output layer connected to said hidden layer by a second set of weighted connections.

41. The method according to claim 40, wherein a back-propagation technique trains the neural network to determine whether the time domain signal represents breaking glass by causing the neural network to associate each of the plurality of collected signal samples to a desired neural network output by adjusting the first set of weighted connections and the second set of weighted connections.

42. The method according to claim 41, wherein the plurality of collected signal samples comprises a plurality of glass break sound samples and a plurality of non-glass break sound samples.

43. The method according to claim 39, further comprising the step of providing a microprocessor, wherein the characteristic extraction unit and the classifier comprise software modules that are executed by said microprocessor.

* * * * *